April 12, 1966     A. M. WERBOWETZKI     3,245,259
DEPTH GAUGE PLUG
Filed Nov. 21, 1963
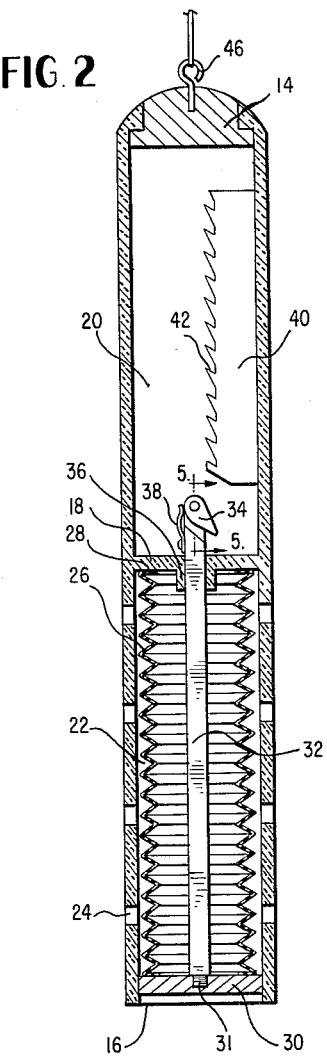
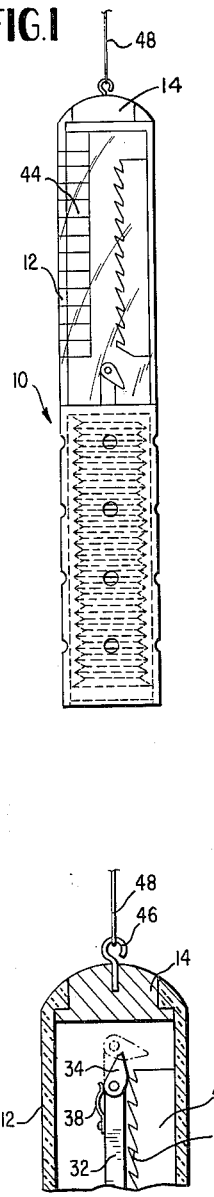
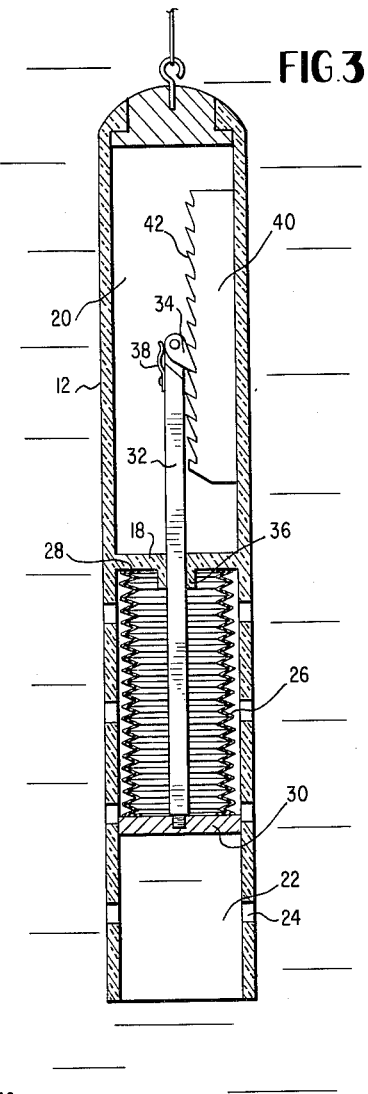
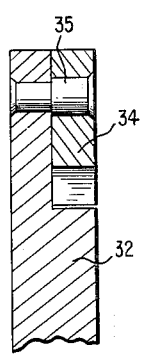
INVENTOR.
ADOLF M. WERBOWETZKI
BY
*Patterson, Wright & Patterson*
ATTORNEYS

United States Patent Office 3,245,259
Patented Apr. 12, 1966

3,245,259
DEPTH GAUGE PLUG
Adolf M. Werbowetzki, 12501 Feldon St.,
Silver Spring, Md.
Filed Nov. 21, 1963, Ser. No. 325,344
4 Claims. (Cl. 73—300)

The present invention relates generally to a depth gauge and more particularly and specifically to a depth gauge plug primarily intended for use in ascertaining the depth and temperature of water.

It is an object of the present invention to provide a device which would have substantial utility to fishermen wading in rivers and streams with unknown drop-offs and holes to enable them to ascertain dangerous conditions by permitting them to readily determine the depth of a strange body of water.

Another object of this invention lies in the provision of a depth gauge plug which would have utility by fishermen in readily ascertaining the depth and temperature of a body of water to indicate the possible or probable presence of fish when the preferences of different species of fish for water depths and temperatures are known.

A further object of the present invention is to provide a small, compact plug which contains readily usable and accurate indicators for water temperatures and depths.

Another object of the present invention resides in the provision of a simple and inexpensive plug containing water depth and temperature indicating devices which may be quickly and easily used to give accurate indication of water temperatures and depths by the simple expedient of submersion and retrieval of the plug from any specific body of water.

Another object of the present invention resides in the provision of an extremely simple and inexpensive device which is accurate and durable over long periods of use.

Still further objects and advantages of the present invention will become readily apparent to one skilled in the art when the following general statement and description are read in the light of the accompanying drawings.

The nature of the present invention may be stated in general terms as relating to a depth gauge plug consisting of an elongated tubular casing of rigid, transparent material divided internally thereof with a partition wall longitudinally of the length of the casing, a flexible bellows securely attached in one of said chambers forming an air and water tight plug therein, an elongated rod concentrically within said bellows extending through the partition wall of said casing and presenting on the extended end thereof a ratchet pawl, a ratchet rack secured longitudinally within the second enclosed chamber of said casing and aligned with the axial movement of said rod and pawl within said chamber, a scale within the transparent chamber in calibrated relationship to said rack, and a thermometer within and visible from without said transparent chamber.

Referring now to the accompanying drawings in which like numerals designate similar parts throughout the several views:

FIG. 1 is an elevational view of the depth gauge plug constituting the present invention;

FIG. 2 is an enlarged sectional view taken on the longitudinal axis of the depth gauge plug with the components thereof in one position of operation;

FIG. 3 is a view similar to FIG. 2 with the components of the gauge device in a second position of operation;

FIG. 4 is a fragmentary section of the depth gauge plug with the components thereof in a release position;

FIG. 5 is an enlarged fragmentary section taken on line 5—5, FIG. 2.

With more particular reference to the accompanying drawings, the depth gauge plug device, generally designated 10, consists of a tubular casing 12 formed of a rigid transparent material, such as plastic or the like, which is provided at one end thereof with an arcuate nose plug 14 formed of lead or other heavy, weighting material, and which is open, as at 16, at the second end thereof. The casing 12 is provided intermediate its length with an annular partition wall 18 dividing the casing into a forward enclosed, water-tight chamber 20 and a rear open chamber 22. The casing 12 is provided with a series of circumferentially, radially arranged perforations or openings 24 rearwardly of the partition wall and in communication with the rear open chamber 22 of the casing.

Positioned within the rear open chamber 22 of the casing is an elongated flexible bellows 26 which has one end thereof secured, as at 28, to the partition wall 18 and which is secured at the second rearward end thereof to a solid plug 30 which encloses the open end 16 of the chamber 22 and which is in telescopic sliding engagement with the interior wall of the plug chamber.

Associated with the solid plug 30 is an elongated rigid rod 32 which is threadedly secured as at 31 into the axial center of the plug 30 to project longitudinally, concentrically through said bellows with the second end thereof extending through a central, sealed boss 36 in the partition wall 18 into the enclosed chamber 20 of the casing. That end of rod 32 located within chamber 20 is provided with a ratchet pawl 34 pivoted, as at 35, thereon and engaging a spring element 38 urging the pawl to an extended position away from the axial centerline of the rod 32.

Located within the chamber 20 is a fixed ratchet rack 40 which presents a series of ratchet teeth 42 longitudinally of the casing adjacent the axial centerline thereof with the teeth being inclined toward the forward closed end of the chamber. Also within chamber 20 and in a fixed relationship to the toothed rack is an indicating scale 44 divided into increments designating depth measurements calibrated in relationship to the teeth 42 of the rack 40. Said scale 44 is positioned to be readily visible through the transparent casing wall of the plug device.

The forward, weighted nose plug of the depth gauge device is provided with a fixed rigid eye 46 into which may be readily attached a drag and retrieving line 48.

It is also fully contemplated that a typical mercury thermometer (not shown) may be provided within chamber 20 in a position to be readily visible through the transparent wall of casing 12.

Further, it is to be recognized and understood that the relative dimensioning of the several components, including the bellows, the ratchet rack and the associated depth gauge scale are pre-calibrated in operable relationship, one to the other, to give accurate and functional effect to the depth gauge plug herein disclosed and claimed.

In a typical operation of the structural components hereinbefore disclosed, a fisherman would attach the rigid eye 46 of the depth gauge plug to a line 48 and cast the plug into a body of water having an unknown depth and temperature permitting the weighted end of the plug to fully submerge the plug in the body of water to the bottom thereof. As the depth gauge plug submerges within a body of water the pressure increase occurring as the plug submerges will exert pressure on the solid plug 30 of the device causing the compression of the bellows from the position shown in FIG. 2 of the drawings to an intermediate position such as is shown in FIG. 3 of the drawings, dependent upon the depth of the water and the pressure exerted thereby.

As the bellows 26 is compressed within chamber 22 of the plug, the rod 32 will be extended through the sealed boss 36 of the partition wall causing the ratchet pawl 34 to move along the toothed rack 40 in a typical ratchet action. When the plug has reached the bottom of the body of water the fisherman would then retrieve the same by the line 48. As the plug is withdrawn the pressure is reduced on plug 30 and the air, heretofore compressed within bellows 26 will exert an expansion force moving rigid rod 32 in a direction opposite to its prior movement until the ratchet pawl 34 is locked into a tooth 42 of the toothed rack 40. Once the ratchet pawl has been locked in place the expansion of the bellows will be terminated, and when the plug is withdrawn from the water by the fisherman the depth which the plug attained in the water may be readily ascertained by reference to the depth gauge scale 44 using the appropriate tooth 42 with which the pawl is engaged as a reference point for the scale.

To ready the device or subsequent reuse the fisherman then need only put his finger in the open end of the chamber 22 and compress the bellows to a point where the ratchet pawl will move beyond the extreme end of the toothed rack, as illustrated in FIG. 4, whereupon the pawl will be released and the bellows may be allowed to expand to its maximum position as shown in FIG. 2, permitting the pawl to return to its operable position under influence of spring 38.

Insofar as determination of water temperature is concerned, it would be readily apparent to one using the depth gauge that it would be necessary to permit the plug to remain in its submerged position a sufficient period of time to allow the temperature of the water to exert its maximum influence on the thermometer, not shown, within the transparent casing in order that an accurate temperature reading be attained.

From the foregoing it may be seen that a simple and inexpensive device has been provided which has substantial utility for fishermen, skin divers, and other interested in quickly ascertaining the depth and temperature of water bodies. It is further evident that a simple and effective device has been provided which attains all of the objects and advantages heretofore attributed to it.

It is fully contemplated that modifications and variations may be made in the device hereinbefore disclosed, the prior disclosures being for the purposes of illustration of an operable embodiment only, and the present invention is not to be limited beyond the scope required by the prior art and the appended claims.

Having fully described and disclosed my invention, what I desire to claim is:

1. A depth gauge comprising, an elongated casing having a transparent wall portion therein, an elongated ratchet rack fixed longitudinally in said casing, a depth gauge scale in fixed relationship to said rack and calibrated to the increments thereof, a bellow in said casing, said casing having an open end adjacent one end of said bellows, and a rod supported in coaxial extension from the second end of said bellows presenting a ratchet pawl thereon in movable engagement with said rack.

2. A depth gauge comprising, an elongated transparent casing, a partition dividing said housing longitudinally thereof into two compartments, an elongated ratchet rack fixed longitudinally in one compartment, a bellows in said second compartment, said second compartment being open through that end of said casing remote to said first compartment, said bellows supporting a rigid bar extending into said first compartment, a ratchet pawl pivoted on said bar in operable engagement with said rack, and a depth gauge scale in fixed relationship with said fixed rack and calibrated thereto.

3. A depth gauge comprising, an elongated transparent casing having a closed weighted nose and an open rearward end, a partition intermediate the casing length dividing it into a front watertight compartment and open rear compartment, a ratchet rack in the front compartment disposed longitudinally therein, a depth gauge scale associated with said rack and calibrated to the increments thereof, a bellows in the rear compartment secured to the partition wall at one end thereof and to a solid plug slidable in said compartment at the second end thereof, an elongated rod fixed to the bellow plug and extending coaxially of the bellows through the partition into the front compartment, and a spring biased ratchet pawl on said rod in operable engagement with said rack.

4. A depth gauge comprising, an elongated casing, an elongated ratchet rack fixed in said casing, a pressure responsive element movable longitudinally of said casing and presenting a pawl in one-way locking engagement with said rack, and a calibrated depth gauge scale in fixed association with said rack.

References Cited by the Examiner
UNITED STATES PATENTS

| | | | |
|---|---|---|---|
| 410,786 | 9/1889 | Cooper et al. | 73—300 |
| 753,948 | 3/1904 | Wigzell | 73—300 |
| 1,402,139 | 1/1922 | Bradley | 73—396 |
| 1,915,122 | 6/1933 | Crowley | 73—396 |

FOREIGN PATENTS 686,887    2/1953    Great Britain.

ISAAC LISANN, *Primary Examiner.*